United States Patent
Freeman

(10) Patent No.: US 7,279,098 B2
(45) Date of Patent: Oct. 9, 2007

(54) WATER TREATMENT APPARATUS

(76) Inventor: Brian A. Freeman, 9317 Erickson St., Brooklyn Park, MN (US) 55428

( * ) Notice: Subject to any disclaimer, the term of this patent is extended or adjusted under 35 U.S.C. 154(b) by 478 days.

(21) Appl. No.: 10/897,940

(22) Filed: Jul. 23, 2004

(65) Prior Publication Data
US 2005/0023213 A1    Feb. 3, 2005

Related U.S. Application Data

(60) Provisional application No. 60/490,357, filed on Jul. 28, 2003.

(51) Int. Cl.
*C02F 1/38* (2006.01)
(52) U.S. Cl. .................. 210/512.1; 209/725
(58) Field of Classification Search ............ 210/787, 210/512.1; 209/725
See application file for complete search history.

(56) References Cited

U.S. PATENT DOCUMENTS 5,248,421 A * 9/1993 Robertson ............. 210/512.1
2005/0150827 A1* 7/2005 Hopper ................. 210/512.1

* cited by examiner

*Primary Examiner*—David A Reifsnyder
(74) *Attorney, Agent, or Firm*—Clayton R. Johnson

(57) ABSTRACT

The water treatment apparatus includes a first fitting having a first leg adapted for being connected to a supply of fluid and a second fitting having a first leg adapted for being connected to a container for the treated fluid, an elongated rod having a first end mounting the first fitting and a second end mounting the second fitting, each fitting having bifurcated legs, and a first and a second vortexian spiral tube respectively connecting the first bifurcated legs of the fittings and the second bifurcated legs of the fittings. Each tube includes a plurality of loops and a plurality of linear sections serially connecting adjacent loops to one another. Where each tube includes seven loops, advantageously the area encompassed by the loops of each tube in the direction from one fitting to the other is 1:1:2:3:5:8:13.

16 Claims, 4 Drawing Sheets

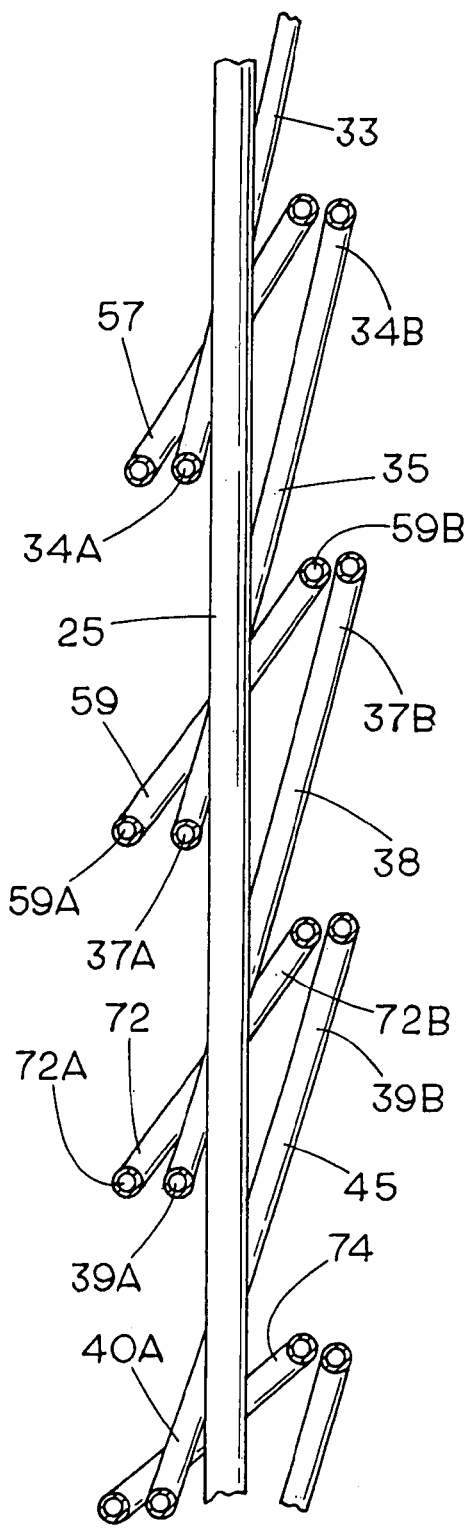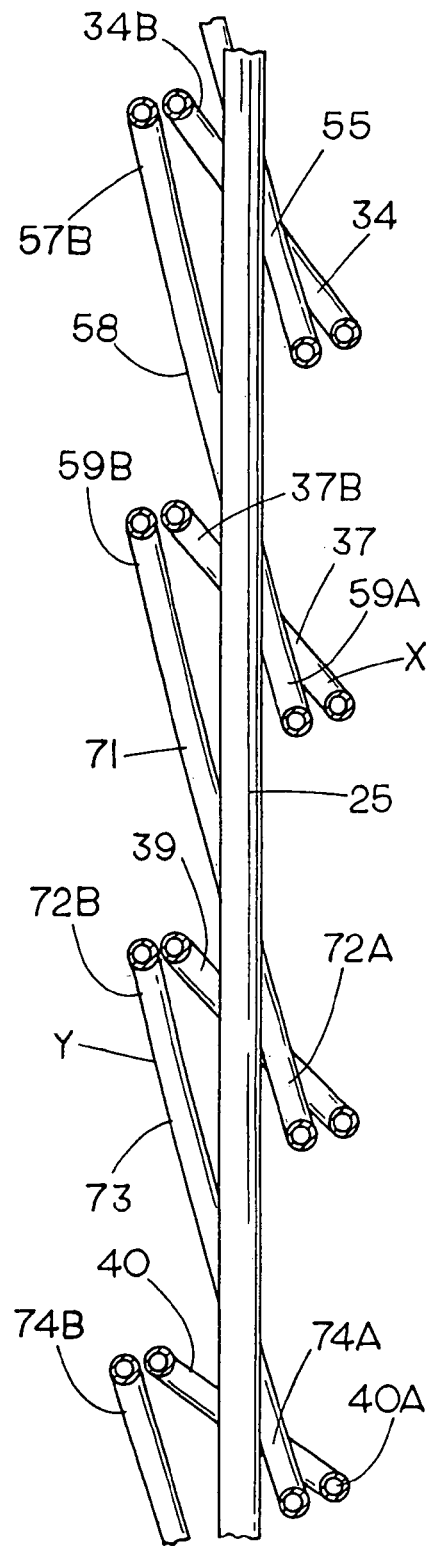

WATER TREATMENT APPARATUS

CROSS REFERENCE TO RELATED APPLICATION

This application claims the benefit of U.S. Provisional Application 60/490,357, filed Jul. 28, 2004.

BACKGROUND OF THE INVENTION

This invention relates to apparatus for conditioning or treating water that is believed to improve the quality of water used in supporting life.

SUMMARY OF THE INVENTION

Applicant believes that the crystalline structure of water is varied as it flows through the apparatus of the invention and thereby improves its life supporting and other qualities. The apparatus includes two fittings having bifurcated legs, for example Y-shaped fittings with a longitudinally elongated conductive metal rod extended therebetween and a pair of elongated vortexian spiral tubes symmetrically positioned around the rod with each tube having seven helical circular loops extending in fluid conducting relationship to the respective legs of the fittings. The tubes are mounted in overlaying relationship with the loops of each tube overlaying loops of the same size as those of the other tube and the loops of one tube being would in clockwise direction and those of the other tube in a counterclockwise direction. Advantageously the area encompassed by the loops of each tube in the direction from one fitting to the other is 1:1:2:3:5:8:13.

BRIEF DISCRIPTION OF DRAWINGS

FIG. 3 is a longitudinal, enlarged fragmentary view that is generally taken along the line and in the direction of the arrows 3-3 of FIG. 1 with the spacing of the loops from the rod being exaggerated;

FIG. 4 is a longitudinal enlarged fragmentary view that is generally taken along the line and in the direction of the arrows 4-4 of FIG. 1 with the spacing of the loops from the rod being exaggerated;

DETAILED DESCRIPTION OF THE INVENTION

Figure 1:
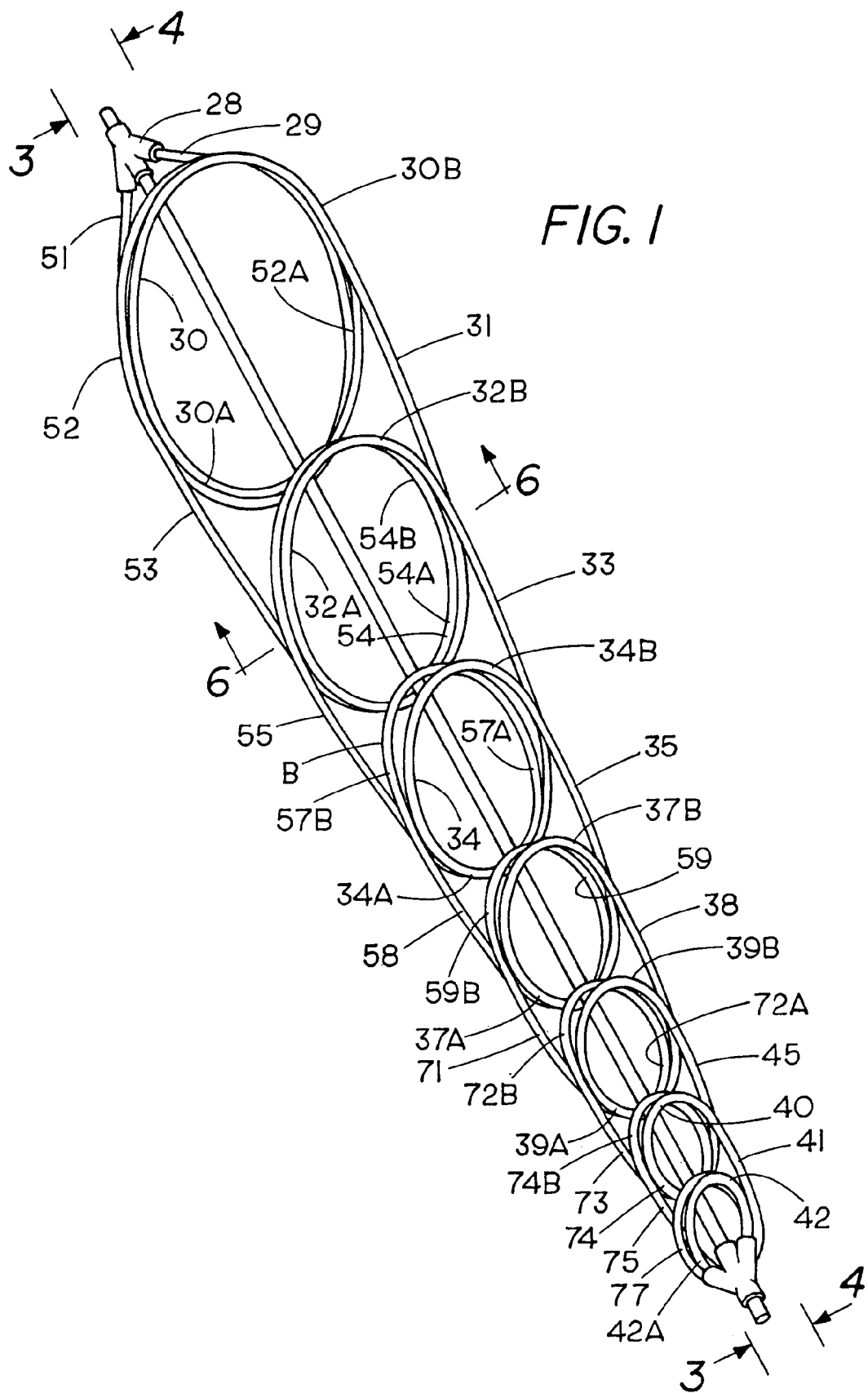
FIG. 1 is a perspective view of the first embodiment of the invention.

The water treatment apparatus of the first embodiment of this invention includes a longitudinally elongated, solid rod 25 made of an electrically conductive metal, advantageously stainless steel. One end of the rod mounts a Y-fitting 28 and at the opposite end mounts a Y-fitting 44. The fitting 28 includes a main leg 28A that is fluidly connectable to a member 24 and bifurcated legs 28B, 28C that diverge in opposite directions at equal angles from the central axis of the main leg. The transverse cross sectional, fluid flow conducting area of leg 28A is twice that of each of legs 28B, 28C. Similarly the fitting 44 includes a main leg 44A that is fluidly connectable to a member 23 and bifurcated legs 44B, 44C with the cross sectional fluid flow conducting area of leg 44A being twice that of each of legs 44B, 44C.

Fluidly connected to and extending between the legs 28A, 44A is an elongated, conductive metal tube X. The tube X in extending from leg 28A to leg 44A is bent to have several, substantial circular helix loops 30, 32, 34, 37, 39, 40, 42 that are coiled in a clockwise direction with the rod 25 extending through each of these loops. As viewed in plan view (the apparatus being supported on a horizontal surface with the rod being parallel to the surface), each of the loops includes a generally semicircular part designated with A as the last part of the reference number for each of the loops that extends below the rod and a second general semicircular part designated with the letter B as the last part of the reference number for each of the loops that extends above the rod. Desirably the ratio of the areas encompassed in the helical circular loops in a direction from loop 42 to loop 30 is 1:1:2:3:5:8:13.

Each of the semicircular parts of each of the loops 30, 32, 34, 37, 39, 40, 42 that in part includes the letter B as part of its reference number has one end fluidly connected to the one end of the respective semicircular part that in part includes the letter A. The tube X includes a first end portion 29 that has one end fluidly connected to fitting leg 28B andthe opposite (other) end fluidly connected to the other end of loop 30A. The other end of loop portion 30B is fluidly connected to the other end of loop portion 32A by a generally linear tube portion 31. Likewise, the generally linear tube portion 33 fluidly connects the other end of loop portion 32B to the other end of loop portion 34A, the generally linear tube portion 35 fluidly connects the other end of loop portion 34B to the other end of loop portion 37A, the generally linear tube portion 38 fluidly connects the other end of loop portion 37B to the other end of loop portion 39A, the generally linear tube portion 45 fluidly connects the other end of loop portion 39B to the other end of loop portion 40A and the generally linear tube portion 41 fluidly connects the other end of loop portion 40B to the other end of loop portion 42A. The other end of loop portion 42B is fluidly connected to fitting leg 44B by the opposite end portion 43 of the tube X.

Fluidly connected to and extending between the legs 28C, 44C is an elongated, metal tube Y. The tube Y in extending from leg 28A to leg 44A is bent to have several, substantial circular helix loops 52, 54, 57, 59, 72, 74, 77 that are coiled in a counterclockwise direction with the rod 25 extending through each of these loops. As viewed in plan view, each of the loops of tube Y includes a generally semicircular part designated with A as the last part of the reference number for each of the loops that extends below the rod and a second general semicircular part designated with the letter B as the last part of the reference number for each of the loops that extends above the rod. Desirably the ratio of the areas of the loops in a direction from loop 77 to loop 52 is 1:1:2:3:5:8:13.

Each of the semicircular parts of each of the loops 52, 54, 57, 59, 72, 74, 77 that in part includes the letter A as part of its reference number has one end fluidly connected to one end of the respective semicircular part that in part includes the letter B. The tube Y includes an end portion 51 that has one end fluidly connected to leg 28C and an opposite end portion fluidly connected to other end of loop 52A. The other end of the loop portion 52B is fluidly connected to the other end of loop portion 54A by a generally linear tube portion 53. Likewise, the generally linear tube portion 55 fluidly connects the other end of loop portion 54B to the other end of loop portion 57A, the generally linear tube portion 58 fluidly connects the other end of loop portion 57B to the other end of loop portion 59A, the generally linear tube portion 71 fluidly connects the other end of loop portion 59B to the other end of loop portion 72A, the generally linear tube portion 73 fluidly connects the other end of loop portion 72B to the other end of loop portion 74B and the generally linear tube portion 75 fluidly connects the other end of loop portion 74B to the other end of loop portion 77A. The other end of loop portion 77B is fluidly connected to fitting leg 44C by the opposite end portion 50 of the tube Y.

The length of each of the tube linear section is about the same of the combined radii of the loops that it is connected to. For example, the length of the linear section 31 is advantageously substantially the same as the combination of the outer radii of the loops 30 and 32 while the length of the linear section 58 is advantageously substantially the same as the combination of the outer radii of the loops 57 and 59. Through the provisions of the linear sections, the loops of each tube are connected in series between the fittings.

The tubes X and Y are of the same electrically conductive metal and may be made of stainless steel or copper and may or may not have their inner and outer surfaces coated with other conductive metals. The pair of tube X and Y are of the same size and shape other than one has its loops bent clockwise and the other has its loops bent counterclockwise whereby the linear sections of one tube are on the transverse opposite side of the rod 25 from the linear sections of the other tube. Thus, the tubes are mirror images of one another with the linear sections being on transverse opposite sides of the rod with the loops of one tube substantially overlaying the loops of the same size of the other tube. Further, the rod passes through the central portion of each of the pair of loops.

In use the apparatus of the first embodiment of this invention, water may be supplied from a source 24 to flow through the fitting 28 and tubes X and Y to the fitting 44 and thence to the receptacle 23, or alternately from a source 23 to flow through the fitting 44 and tubes X and Y to fitting 28 and thence to receptacle 24. Thus, regardless whether the water flow is from member 24 to member 23, or from member 23 to member 24, equal volumes of water flow through each of tubes X and Y at the same rate of flow. The water flowing through the tubes may be distilled water.

It is to be understood that the water treatment apparatus may include more than seven loops in each tube. If more than seven loops are included, the additional loops connected between the fitting 28 and the loops 30, 52 with each of the additional loops of each tube being in a ratio that the ones connected to loops 30, 52 and the fitting 28 being the sum of the last two ratios in the series (8 plus 13) of the preceding two loops and the second added loops being the sum of the two preceding loops (13 plus 21) in the series and so on for each additional pair of loops connected between the loops 30, 52 and the fitting 28. With the addition of more loops, the rod 25 would be of greater lengths and there would additional linear sections extending between loops 30, 52 and the additional loops and portions 29, 51, the tubes X and Y being of greater lengths.

Figure 7:
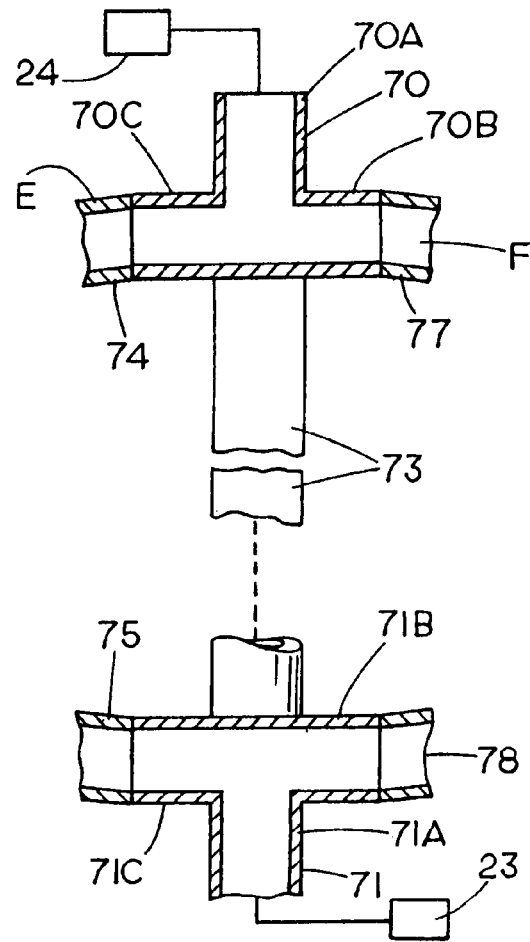
FIG. 7 is a fragmentary view of the second embodiment of the fittings and adjacent ends of the tubes that are connected thereto and the intermediate part of the rod connecting the fittings being broken away.

Referring to FIG. 7, the second embodiment is the same as the first embodiment except that the fittings 70, 71 respectively have their bifurcated legs 70B, 70C and 71B, 71C extending at substantially right angles to their respective main leg 70A, 71A in diametrically opposite directions relative to the main legs. Further, the end portions 74, 77 of the tubes E and F are fluidly connected to the legs 70C, 70B respectively and the opposite end portions 75, 78 are connected to legs 71C, 71B, the tube end portion are of lengths which may be slight different and bent slightly different-from the end portions 51, 29,50, 43 of the first embodiment in view of the bifurcated legs 28C, 28B, 44C, 44B of the first embodiment extend outwardly of the fitting main legs 28A, 44A at a different angles than the bifurcated legs of the fittings 70, 71 extend away from their main legs 70A, 71B. Additionally, the rod 73 which corresponds to rod 25 and mounts the fittings 70, 71 may be slightly shorter than rod 25 in that the end portions 74, 77 that are connected to the largest diameter loops extend more nearly directly toward one another than having to converge toward the respective fitting such as shown for the first embodiment. This is also applicable to the end portions 75, 78 of the tubes of the second embodiment that are connected to the smallest diameter loops and to the bifurcated legs of the fitting 71. Accordingly, even though the loops of the second embodiment are of the same size and shape as those of the first embodiment, the longitudinally adjacent surfaces of the fittings 70, 71 are slightly more closely adjacent one another than the juncture of ends of the rod 25 to the fittings 28, 44. Other than for the above differences of the end portions of the tubes E, F, the tubes E, F include loops and linear portions (not shown) that are the same size and shape as the corresponding parts of Y, X. Even though not shown, the end portions 74, 77 are fluidly connected to larger diameter loops that correspond to loops 30, 52 and the tube end portions 75, 78 are fluidly connected to the smaller diameter loops that correspond to loops 42, 77.

In use the apparatus of the second embodiment of this invention water or other liquid may be supplied from a source 24 to flow through the fitting 70 and tubes E and F to the fitting 70 and thence to the receptacle 23, or alternately from a source 23 to flow through the fitting 71 and tubes E and F to fitting 70 and thence to receptacle 24. Thus, regardless whether the water flow is from member 24 to member 23, or from member 23 to member 24 of the second embodiment, equal volumes of water flow through each of tubes E and F at the same rate of flow. The water flowing through the tubes may be distilled water.

Figure 2:
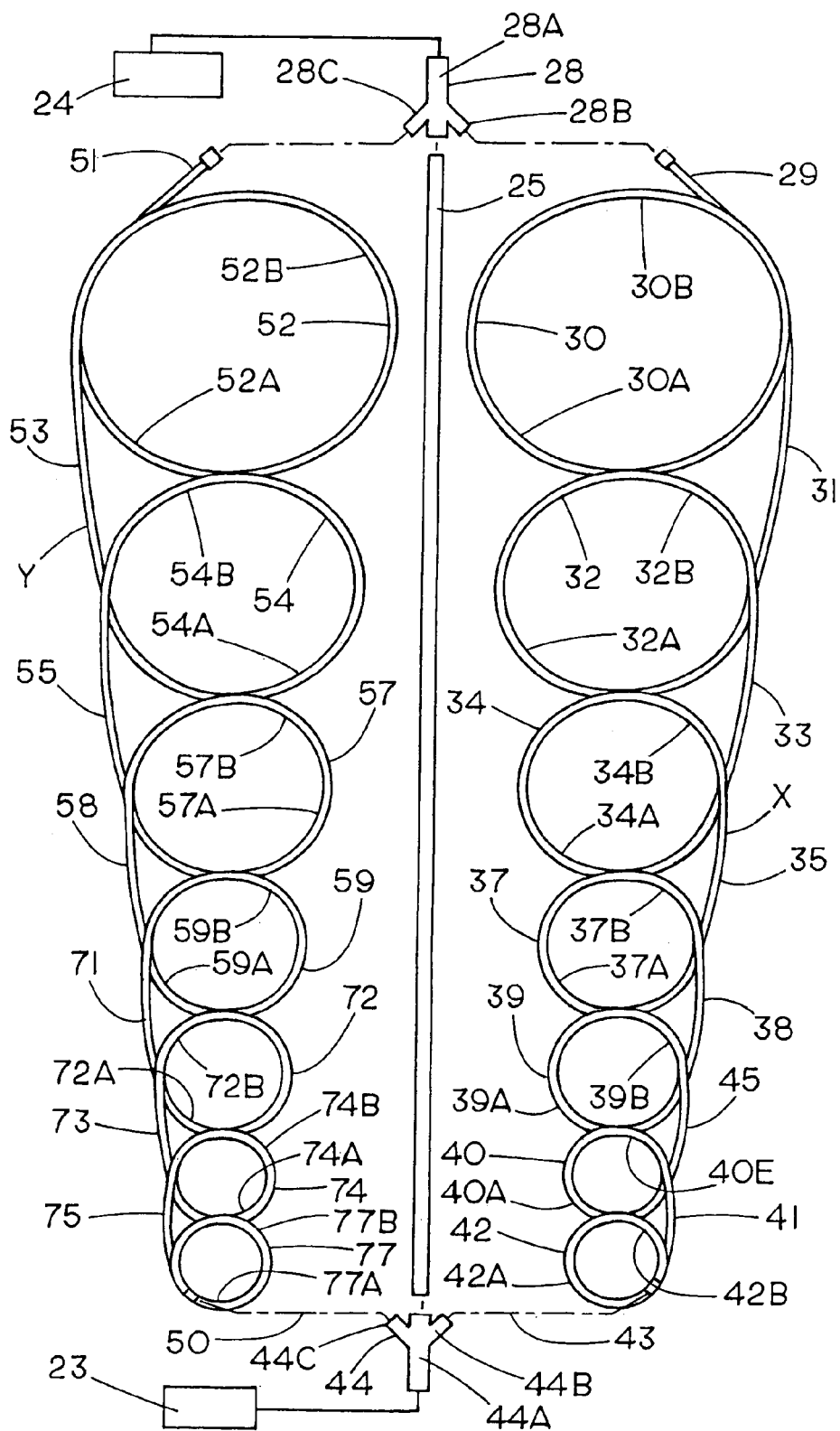
FIG. 2 is an exploited view of the first embodiment of the invention.
Figure 5:
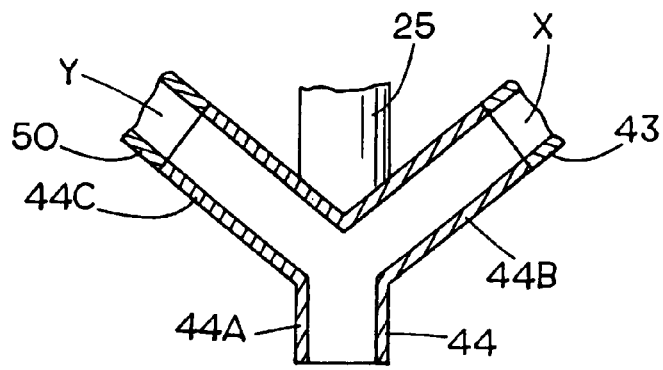
FIG. 5 is an enlarged cross sectional view of one of the Y-fittings of the first embodiment.
Figure 6:
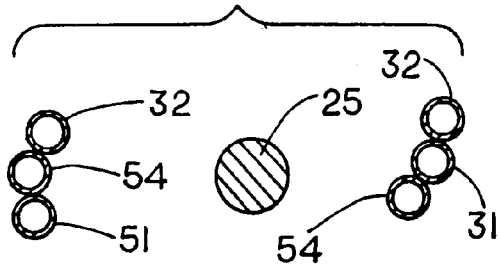
FIG. 6 is a transverse cross section view that is generally taken along the line and in the direction of the arrows 6-6 of FIG. 1.

As shown in FIG. 2, the receptacle 24 is connected to the main leg 28A of the fitting 28 while the main leg 44A of the fitting 44 is connected to the receptacle 23. Further, as shown in FIG. 7, the receptacle 24 is connected to the main leg 70A of the fitting 70 while the main leg 71A of the fitting 71 is connected to the receptacle 23. Additionally, as shown in FIG. 2, the loops of each tube are qenerally circular, serially connected and respectively include loops 54, 32 that encompasses areas that are larger than that encompassed by loops 57, 34 and smaller than that encompassed by loops 52, 30.

EXAMPLE

In order to ascertain the effects on a liquid passed through the second embodiment of the invention, measurements were made to ascertain various parameters of spring water (sample A), a quantity of the spring water that was the same as that of sample A was pumped to pass from member 24 to flow first through the large loops and subsequently to member 23 (sample B) and a quantity of the spring water that was the same as sample A was similarly pumped to pass from member 23 to flow first through the small loops and subsequently to member 24. The total length of each of the tube E, F was approximately 12 feet. As Samples B and C, the flow rate through the tubes was approximately 1.75 gallons/minute and the pump pressure was approximately 58 psi. The inner diameter of each tube was approximately an eighth of an inch.

| SAMPLE | pH | Density (g/mL) | Specific Gravity | Surface Tension (dynes/cm) |
|---|---|---|---|---|
| A | 6.60 | 0.997 | 1.000 | 69.2 |
| B | 6.81 | 0.997 | 1.000 | 59.8 |
| C | 6.94 | 0.997 | 1.000 | 67.2 |

Each sample was analyzed in five replicates for apparent surface tension. The average of the three best values, a gravity constant of 980.8 cm/sec$^2$, an R/r value for the platinum ring of 53.6 and the sample density reported above were used to determine the correction factor calculating the true surface tension.

With lower surface tensions, is absorbed more easily through plant and animal cellular walls. Basically with lower surface tensions, the water is wetter and the water is absorbed easier through the cellular walls. As a result there can be better hydration of the cells. It also enhances the cellular waste exchange.

With a somewhat increase in the alkalinity of the water, there is provided an increased benefit to living cells.

Although it is preferred that the tubes be of conductive metal, it is to be understood they could be made of other materials. Also, even though it is preferred the liquid flowing through the tubes is water, it could be other types of fluids.

What is claimed is:

1. For treating water flowing from a source to a container for the treated water, water treatment apparatus, comprising a first fitting having a first main leg fluidly connectable to the source and first and second bifurcated legs joined to the first main leg in fluidly communication therewith, a second fitting having a second main leg fluidly connectable to the container and third and fourth bifurcated legs joined to the second main leg in fluidly communication therewith, a first tube having a first end portion fluidly connect to the first fitting first bifurcated leg, and a second end portion fluidly connected to the second fitting third leg, a second tube having a first end fluidly connected to the first fitting second bifurcated leg and a second end fluidly connected to the second fitting fourth bifurcated leg and a longitudinally elongated rod having a first end portion mounting the first fitting and an opposite second end portion mounting the second fitting in longitudinal spaced relationship to the first fitting, each of the tubes including several helical loops in series between the respective tube end portions and having the rod extending through the loops.

2. The apparatus of claim 1 wherein each tube includes at least three loops that each has a first and a second end and at least one generally linear tubular portion extending between the first end of one of the loops and the second end of an adjacent loop to connect the loops in series.

3. The apparatus of claim 2 wherein each tube includes at least three loops, the three loops of each tube are generally circular, are serially connected and include a first loop, a second loop and a third loop intermediate the first loop and the second loop and the third loop encompasses an area that is larger than that encompasses by the first loop and smaller that encompassed by the third loop.

4. The apparatus of claim 1 wherein each tube includes seven generally circular loops with the loops in a direction from the firsts fitting to the second fitting encompass areas in a ratio of about 1:1:2:3:5:8:13.

5. The apparatus of claim 4 wherein the loops of the first tube include a loop connected to the first leg and a loop connected to the third leg, the loops of the second tube include a loop connected to the third leg and a loop connected to the fourth leg and loops intermediate the loops connected to the legs of the fittings connected to the adjacent loop by a generally linear section that extends therebetween to connect the loops in series.

6. The apparatus of claim 5 wherein each linear section is of a length that is about the same as that of the combined radii of the loops that it is connected to.

7. The apparatus of claim 1 wherein the tubes are vortexian spiral tubes symmetrically position around the rod.

8. The apparatus of claim 7 wherein with the rod extending in a horizontal plane, the loops of one tube are in overlaying relationship to the loops of the other tube and are of about the same size as the loops that they overlay of the other tube.

9. The apparatus of claim 8 wherein the loops of one tube are wound in a clockwise direction from the first fitting to the second fitting and the loops of the other tube are wound in a counterclockwise direction from the first fitting to the second fitting.

10. The apparatus of claim 9 wherein the loops of the first tube include a loop connected to the first leg and a loop, connected to the third leg, the loops of the second tube include a loop connected to the second leg and a loop connected to the fourth leg and loops intermediate the loops connected to the legs of the fittings are connected to the adjacent loop by a generally linear section that extends therebetween, the linear sections of one tube being on the transversely opposite side of the rod from the linear sections of the other tube.

11. The apparatus of claim 9 wherein tubes are of the same size and shape other than the loops of one tube being wound in an opposite direction from the loops of the other.

12. Water treatment apparatus for treating water flowing from a source to a container, comprising a first fitting having a first main leg fluidly connectable to the source and first and second bifurcated legs joined to the first main leg in fluidly communication therewith, a second fitting having second main leg fluidly connectable to the container and first and second bifurcated legs joined to the second main leg in fluidly communication therewith, a first tube having a first end portion fluidly connected to the first fitting first bifurcated leg, and a second end portion fluidly connected to the second fitting first bifurcated leg, a second tube having a first end fluidly connected to the second fitting first bifurcated leg and a second end fluidly connected to the second fitting second bifurcated leg and a longitudinally elongated rod having a first end portion mounting the first fitting and an opposite second end portion mounting the second fitting in longitudinal spaced relationship to the first fitting, the first and second tubes each including first loops having first ends fluidly connected to the first and second leg respectively of the first fitting and opposite ends and second loops having second ends fluidly connected to the respective first and second legs of the second fitting, each tube including at least one additional loop having a first end and a second end in series with the respective first and second loop and a linear section connected between the second end of each loop and the first end of the loop that is serially adjacent thereto, and the main leg of the first fitting has a transverse cross sectional area that is twice that of each of the first and second legs of the first fitting.

13. The apparatus of claim 12 wherein each of the first loops are of the same diameter and are of substantially larger diameters than that of the second loops.

14. The apparatus of claim 13 wherein the loops of the first tube in a direction from the first fitting to the second fitting are wound in the opposite direction from that of the second tube.

15. The apparatus of claim 14 wherein each tube is of the same size and each loop of one tube encompasses substantially the same area as a correspond loop of the other tube.

16. The apparatus of claim 12 wherein the rod extends through the loops, the tubes are of the same size and are of mirror images of one another with the loops of one of the tubes being bent clockwise and the loops of the other tube being bent counterclockwise in extending from one fitting to the other.

* * * * *